(12) United States Patent
Zhang et al.

(10) Patent No.: US 9,436,188 B2
(45) Date of Patent: Sep. 6, 2016

(54) SYSTEMS AND METHODS FOR DETECTING COMPRESSOR SURGE

(71) Applicant: GM GLOBAL TECHNOLOGY OPERATIONS LLC, Detroit, MI (US)

(72) Inventors: Yanyan Zhang, Troy, MI (US); Joseph Mussro, Pittsford, NY (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 546 days.

(21) Appl. No.: 13/901,976

(22) Filed: May 24, 2013

(65) Prior Publication Data

US 2014/0350735 A1    Nov. 27, 2014

(51) Int. Cl.
*G06F 19/00* (2011.01)
*G05D 7/06* (2006.01)
*F04D 27/00* (2006.01)
*F04D 27/02* (2006.01)

(52) U.S. Cl.
CPC ........... *G05D 7/0617* (2013.01); *F04D 27/001* (2013.01); *F04D 27/02* (2013.01)

(58) Field of Classification Search
CPC .. F04D 27/001; F04D 27/02; F04D 27/0223; F02D 41/0007; F02D 41/187; F02D 2200/0406; F02D 2041/1432; F02D 41/005; F02D 41/0072; F02D 2041/1418; F02D 2200/0411; F02D 41/0052; F02D 2009/0237
See application file for complete search history.

(56) References Cited

U.S. PATENT DOCUMENTS

| | | | | |
|---|---|---|---|---|
| 4,594,051 A | * | 6/1986 | Gaston | F04D 27/001 374/10 |
| 5,306,116 A | * | 4/1994 | Gunn | F04D 27/02 415/17 |
| 5,915,917 A | * | 6/1999 | Eveker | F04D 27/02 415/1 |
| 6,298,718 B1 | * | 10/2001 | Wang | F02D 41/0007 701/100 |
| 8,457,834 B2 | * | 6/2013 | Taki | B62D 5/0469 701/29.7 |
| 9,130,370 B2 | * | 9/2015 | Jayanth | G01R 19/10 |
| 2005/0257520 A1 | * | 11/2005 | Fischle | F02B 29/0437 60/600 |
| 2014/0074433 A1 | * | 3/2014 | Crepet | G05B 19/048 702/183 |
| 2015/0096296 A1 | * | 4/2015 | Banker | F02B 37/12 60/611 |

FOREIGN PATENT DOCUMENTS

CN        1330229 A        1/2012

OTHER PUBLICATIONS

CN1330229A Machine Translation.

* cited by examiner

*Primary Examiner* — Darrin Dunn
(74) *Attorney, Agent, or Firm* — Phillips Ryther & Winchester; John P. Davis

(57) ABSTRACT

System and methods for detecting surge conditions in a compressor system are presented. In some embodiments, a method for detecting surge conditions may include receiving a plurality of flow measurements relating to a flow rate through the compressor system. Amplitude calculations may be performed based on at least one of the plurality of flow measurements to identify a possible surge condition. Frequency calculations may also be performed to identify a possible surge condition. A surge condition may be detected based on the results of the amplitude calculation and the frequency calculation and, in response, a surge detection control signal may be generated.

15 Claims, 3 Drawing Sheets

SYSTEMS AND METHODS FOR DETECTING COMPRESSOR SURGE

TECHNICAL FIELD

This disclosure relates to systems and methods associated with compressor systems. More specifically, but not exclusively, this disclosure relates to systems and methods for detecting surge conditions in a compressor system.

BACKGROUND

Compressor systems may be utilized in a variety of vehicle systems. For example, compressor systems may be utilized in providing air at a certain pressure to a vehicle fuel cell ("FC") system. Compressor systems may also be utilized as a component of vehicle coolant systems. Compressors may be used in a variety of other applications including systems not included in vehicles.

Compressor surge conditions may occur during the operation of a compressor system. A variety of conditions can lead to compressor surge. For example, compressor surge may occur when a compressor is overloaded beyond its capacity (e.g., its capacity to move air or the like). During surge conditions, forward flow through a compressor may no longer be maintained and/or an oscillating flow in both directions may occur. Such surge conditions may cause the compressor to stall and can result in damage.

SUMMARY

Systems and methods are presented for detecting surge conditions in a compressor system and/or taking actions to mitigate damage to the compressor system caused by surge conditions. Flow oscillations associated with compressor surge conditions may have high frequency and/or amplitude. Consistent with embodiments disclosed herein, frequency and/or amplitude calculations performed using flow information may be used to detect and/or identify the occurrence of surge conditions.

In certain embodiments, a method for detecting surge conditions in a compressor system may include receiving a plurality of flow measurements relating to a flow rate through the compressor system. The plurality of flow measurements may include at least one of an air inlet flow rate, a low pass filtered air inlet flow rate, and a derivative of the air inlet flow rate. An amplitude calculation may be performed based on at least one of the plurality of flow measurements to identify a possible surge condition. In certain embodiments, the amplitude calculation may include comparing an air inlet flow rate with a low pass filtered air inlet flow rate and determining that a difference between the air inlet flow rate and the low pass filtered air inlet flow rate is larger than a first threshold or less than a second threshold. Based on the determination, a number of flow rate oscillations events may be counted. If the number of flow rate oscillation events exceeds a value, a possible surge event based on the amplitude calculation may be identified.

A frequency calculation based on at least one of the plurality of flow measurements may be also performed to identify the possible surge condition. The frequency calculation may include comparing a derivative of an air inlet flow rate with a threshold and determining that the derivative of the air inlet flow rate is larger than the threshold. Based on the determination, a count of a number of flow rate oscillation events may be maintained. If the number of flow rate oscillation events exceeds a value, a possible surge event based on the frequency calculation may be identified. A surge condition may be detected based on results of the amplitude calculation and the frequency calculation and, in response, a surge detection control signal may be generated that may implement one or more surge condition mitigation methods.

In further embodiments, a system may comprise a compressor system having a flow meter disposed in an inlet path thereof configured to generate a plurality of flow measurements. A compressor control system communicatively coupled with the flow meter and the compressor system may be configured to, among other things, receive the plurality of flow measurements, perform an amplitude calculation to identify a possible surge condition based on at least one of the plurality of flow measurements, perform a frequency calculation to identify the possible surge condition based on at least one of the plurality of flow measurements, detect a surge condition based on the results of the amplitude calculation and the frequency calculation, and generate a surge detection control signal based on the detected surge condition.

In some embodiments, in performing the amplitude calculation, the compressor control system may be configured to compare an air inlet flow rate with a low pass filtered air inlet flow rate, determine that a difference between the air inlet flow rate and the low pass filtered air inlet flow rate is larger than a first threshold or less than a second threshold, count a number of flow rate oscillation events, and identify a possible surge event if the number of flow rate oscillation events exceeds a value. In further embodiments, in performing the frequency calculation, the compressor control system may be configured to compare a derivative of an air inlet flow rate with a threshold, determine that the derivative of the air inlet flow rate is larger than the threshold, maintain a count of a number of flow rate oscillation, and identify a possible surge event based on count exceeding the value.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

The embodiments of the disclosure will be best understood by reference to the drawings, wherein like parts may be designated by like numerals. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

Embodiments of the systems and methods disclosed herein may allow for the detection of surge conditions in a compressor system. In some embodiments, surge conditions may be detected using information provided by a flow meter associated with a compressor system configured to measure flow through the compressor system. Under surge conditions, flow through the compressor system may be unstable. Such instability may be detected by the flow meter as flow oscillations. Systems and methods disclosed herein may associate continuous flow oscillations measured by the flow meter with the occurrence of compressor surge conditions. Once surge conditions are detected, a variety of actions may be taken to mitigate damage to the compressor system including, for example, performing one or more surge mitigation methods by a compressor system controller to mitigate damage caused by the surge conditions (e.g., utilizing one or more surge mitigation algorithms or the like).

Figure 1:
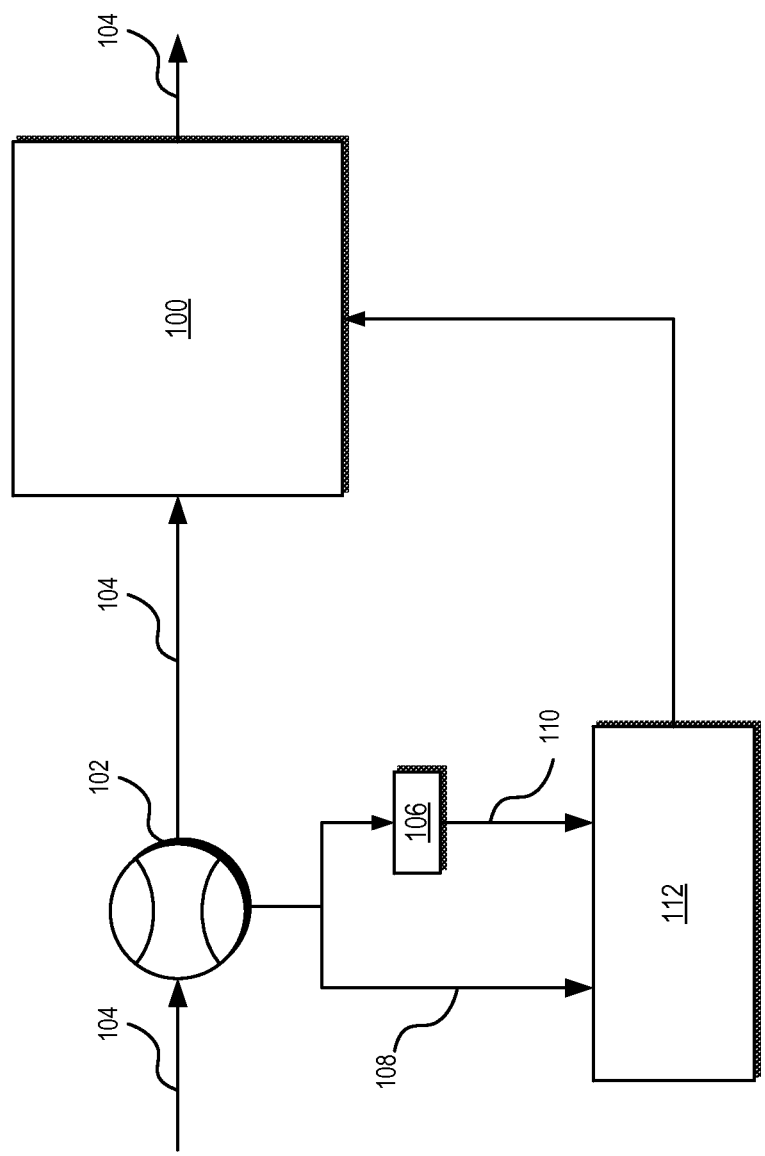
FIG. 1 illustrates a system for detecting surge conditions in a compressor system consistent with embodiments disclosed herein.

FIG. 1 illustrates a system for detecting surge conditions in a compressor system 100 consistent with embodiments disclosed herein. The system may include a flow meter 102 disposed in a flow path 104 of the compressor system 100. For example, as illustrated, a flow meter 102 may be disposed at an inlet of the compressor system 100.

In some embodiments, the flow meter 102 may be configured to measure an air inlet flow rate (dm_Airin). The flow meter 102 may be communicatively coupled to a compressor controller system 112 and may provide the controller system 112 with measured air inlet flow rate information. The flow meter 102 may further be communicatively coupled with a low pass filter 106 configured to provide the compressor controller system 112 with low pass filtered measured air inlet flow rates (dm_AirInFiltSrg). In some embodiments, the compressor controller system 112 may be capable of generating low pass filtered measured air inlet flow rates based on information provided directly by the flow meter 102.

The compressor controller system 112 may be communicatively coupled to the compressor system 100 and may provide one or more control commands to the compressor system 100 configured to control the operation of the compressor system 100. In certain embodiments, the compressor controller system 112 may be configured to detect a surge condition in the compressor system 100 based in information provided by the flow meter 102 (e.g., measured air inlet flow rates and filtered inlet flow rates).

Flow oscillations in flow path 104 associated with compressor surge conditions may have high frequency and/or amplitude. Consistent with embodiments disclosed herein, frequency and/or amplitude calculations performed using information measured by the flow meter 102 may be used to detect and/or identify the occurrence of surge conditions.

In certain embodiments, an amplitude calculation performed by the compressor controller system 112 may compare the air inlet flow rate (dm_Airin) with its low pass filtered value (dm_AirInFiltSrg). If the difference between the air inlet flow rate and the low pass filtered air inlet flow rate is larger than a certain threshold and/or smaller than a certain threshold, rising edges of flow rate oscillation events may begin to be captured and/or counted by the compressor controller system 112. If the counted oscillation events are larger than particular value (e.g., a calibrated value), a surge condition may be suspected by the compressor controller system 112 based on the amplitude calculations. In some embodiments, the thresholds and/or count values may be determined experimentally and/or through any suitable calibration procedure (e.g., calibration procedures utilizing one or more actual compressors to tune the thresholds and/or count values to achieve desired surge detection speed and/or accuracy).

In further embodiments, a frequency calculation performed by the compressor controller system 112 may compare the derivative of the air inlet flow rate (dm_Airin) with a particular threshold. If the derivative of the air inlet flow rate is larger than the threshold, rising edges of flow rate oscillation events may begin to be captured and/or counted by the compressor controller system 112. In certain embodiments, if a speed of the compressor system 100 is less than a minimum speed or the time span between oscillation events is larger than a certain time threshold, the counter may be reset. If the counted oscillation events are larger than particular value (e.g., a calibrated value), a surge condition may be suspected by the compressor controller system 112 based on the frequency calculations. In some embodiments, the thresholds, speeds, and/or count values may be determined experimentally and/or through any suitable calibration procedure (e.g., calibration procedures utilizing one or more actual compressors to tune the thresholds, speeds, and/or count values to achieve desired surge detection speed and/or accuracy).

When both the amplitude and the frequency calculations result in a surge condition being suspected, the compressor controller system 112 may detect the occurrence of a surge condition and a compressor surge detection control signal may be asserted. In response to the compressor surge detection control signal, a variety of actions (e.g., actions by the compressor controller system 112) may be taken to mitigate damage to the compressor system 100 including, for example, performing one or more surge mitigation methods to mitigate damage caused by the surge conditions (e.g., by utilizing one or more surge mitigation algorithms or the like). In some embodiments, the compressor surge detection control signal may be reset after a particular time if no further surge conditions are detected. In some embodiments, the time period may be determined experimentally and/or through any suitable calibration procedure (e.g., calibration procedures utilizing one or more actual compressors to tune the time period to achieve desired surge detection speed and/or accuracy).

Certain embodiments disclosed herein may be utilized in connection with a compressor system included in a vehicle. The vehicle may be a motor vehicle, a marine vehicle, an aircraft, and/or any other type of vehicle, and may include an internal combustion engine ("ICE") drivetrain, an electric motor drivetrain, a hybrid engine drivetrain, and/or any other type of drivetrain suitable for incorporating the systems and methods disclosed herein. In further embodiments, the systems and methods disclosed herein may be utilized in connection with a compressor system associated with a fuel cell system included in the vehicle. Systems and methods disclosed herein may further be utilized in connection with any other compressor system included in a vehicle.

Figure 2:
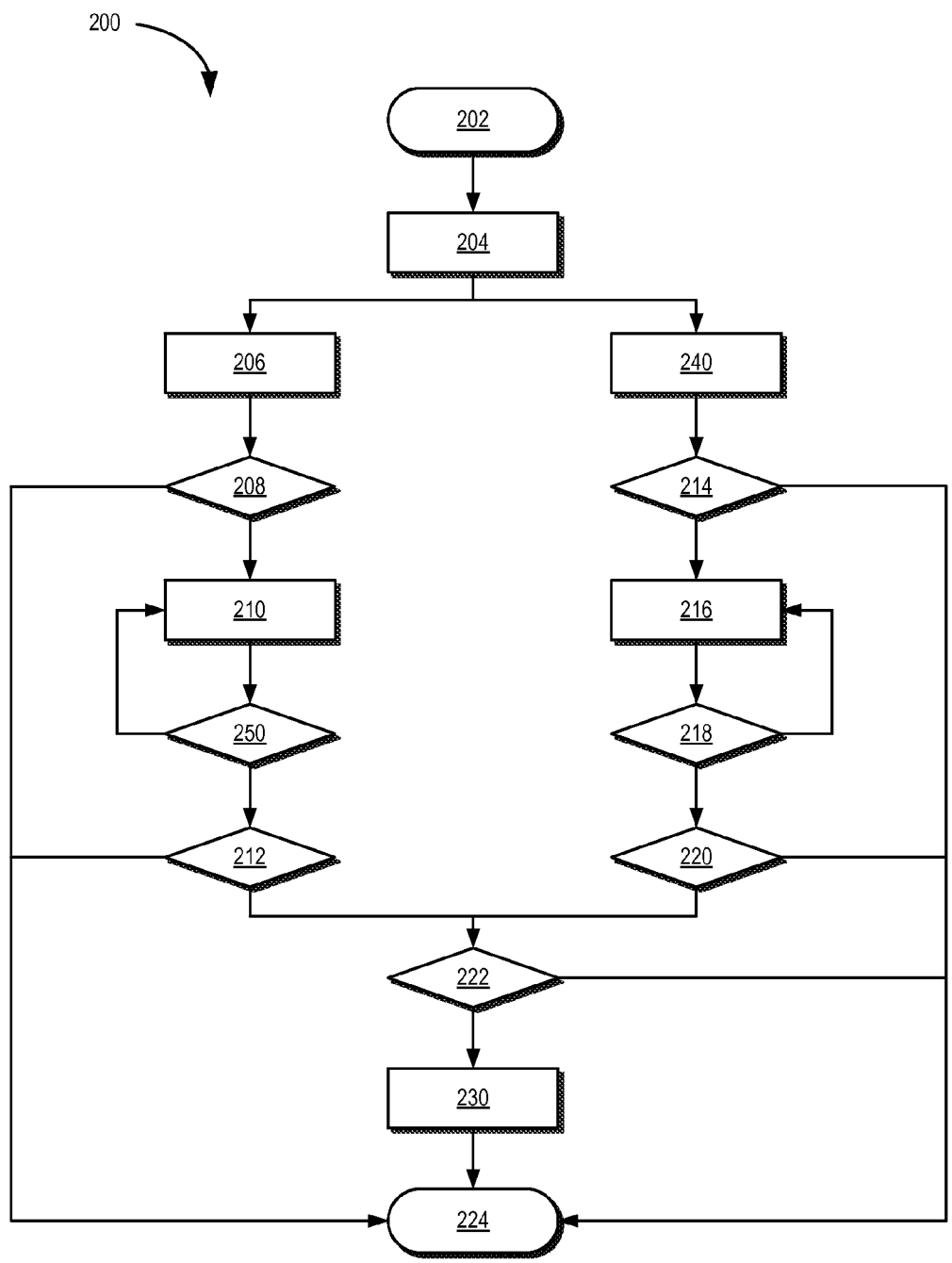
FIG. 2 illustrates a flow chart of an exemplary method for detecting surge conditions in a compressor system consistent with embodiments disclosed herein.

FIG. 2 illustrates a flow chart of an exemplary method 200 for detecting surge conditions in a compressor system consistent with embodiments disclosed herein. At 202, the method 200 may be initiated. At 204, an air inlet flow rate (dm_Airin) and a low pass filtered air inlet flow rate (dm_AirInFiltSrg) may be measured by a flow meter and/or a low pass filter associated with a flow path of the compressor system.

The air inlet flow rate and the low pass filtered air inlet flow rate may be compared at 206. At 208, a determination may be made whether a difference between the air inlet flow rate and the low pass filtered air inlet flow rate is larger than a certain threshold and/or smaller than a certain threshold. If the difference is not larger than the threshold and/or smaller than the threshold, the method 200 may proceed to terminate at 224. If, however, the difference is larger than the threshold and/or smaller than the threshold, the method 200 may proceed to 210.

At 210, rising edges of flow rate oscillation events may be captured and/or counted (e.g., by a compressor controller system 112). At 250, a determination may be made whether a speed of the compressor system is less than a threshold speed (e.g., a minimum threshold speed) or the time span between oscillation events is larger than a certain time threshold. If the speed of the compressor system is less than the minimum speed or the time span between oscillation events is larger than the threshold, the method 200 may proceed to 210 and the counter may be reset. Otherwise, the method 200 may proceed to 212.

At 212, a determination may be made whether the counted oscillation events are larger than particular value (e.g., a calibrated value). If the counted oscillation events are not larger than the value, the method 200 may proceed to terminate at 224. Otherwise, a surge condition may be suspected based on the amplitude calculations and the method 200 may proceed to 222.

Substantially simultaneous or subsequent to steps 206-212, calculations using the measured air inlet flow rate and the low pass filtered air inlet flow rate may be performed at 240. At 240, the derivative of the air inlet flow rate may be calculated. At 214 a determination may be made whether a derivative of the air inlet flow rate is larger than a particular threshold. If the derivative of the air inlet flow rate is not larger than the threshold, the method 200 may proceed to terminate at 224. If, however, the derivative of the air inlet flow rate is larger than the threshold, the method 200 may proceed to 216 where rising edges of flow rate oscillation events may begin to be captured and/or counted. At 218, a determination may be made whether a speed of the compressor system is less than a threshold speed (e.g., a minimum speed) or the time span between oscillation events is larger than a certain time threshold. If the speed of the compressor system is less than the minimum speed or the time span between oscillation events is larger than a the threshold, the method 200 may proceed to 216 and the counter may be reset. Otherwise, the method 200 may proceed to 220.

At 220, a determination may be made whether the counted oscillation events are larger than particular a value (e.g., a calibrated value). If the counted oscillation events are not larger than the value, the method 200 may proceed to terminate at 224. Otherwise, a surge condition may be suspected based on the frequency calculations and the method 200 may proceed to 222.

At 222, if a surge is suspected based on both the amplitude and frequency calculations, the method 200 may proceed to 230, where a surge detection control signal may be asserted. Otherwise, the method 200 may proceed to terminate at 224.

Figure 3:
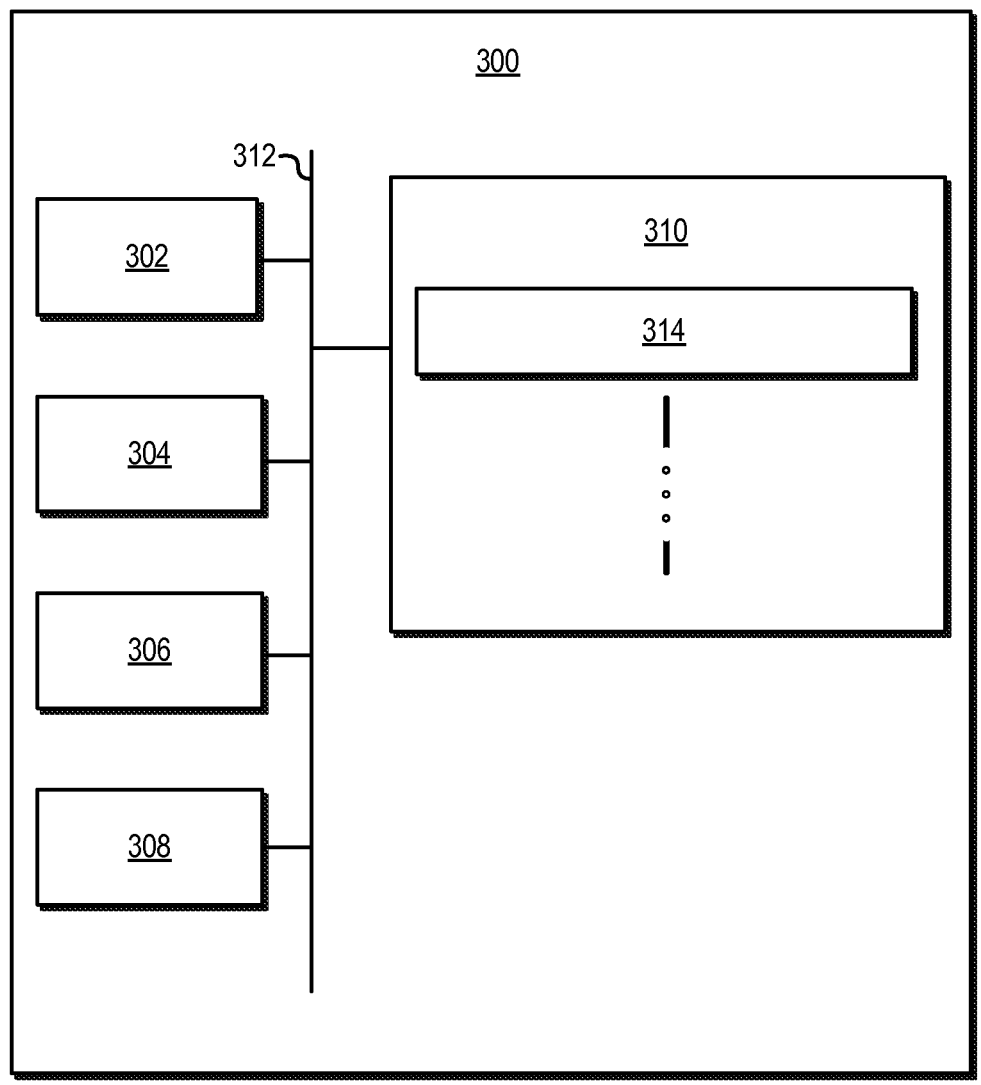
FIG. 3 illustrates a block diagram of a computer system that may be utilized in implementing certain embodiments of the systems and methods disclosed herein.

FIG. 3 illustrates a block diagram of a computer system 300 that may be utilized in implementing certain embodiments of the systems and methods disclosed herein. In certain embodiments, the computer system 300 may be a personal computer system, a server computer system, a compressor controller system, and/or any other type of system suitable for implementing the disclosed systems and methods. In further embodiments, the computer system 300 may be any portable electronic computer system or electronic device including, for example, a notebook computer, a smartphone, and/or a tablet computer.

As illustrated, the computer system 300 may include, among other things, one or more processors 302, random access memory ("RAM") 304, a communications interface 306, a user interface 308, and a non-transitory computer-readable storage medium 310. The processor 302, RAM 304, communications interface 306, user interface 308, and computer-readable storage medium 310 may be communicatively coupled to each other via a common data bus 312. In some embodiments, the various components of the computer system 300 may be implemented using hardware, software, firmware, and/or any combination thereof.

User interface 308 may include any number of devices allowing a user to interact with the computer system 300. For example, user interface 308 may be used to display an interactive interface to a user. The user interface 308 may be a separate interface system communicatively coupled with the computer system 300 or, alternatively, may be an integrated system such as a display interface for a laptop or other similar device. In certain embodiments, the user interface 308 may be produced on a touch screen display. The user interface 308 may also include any number of other input devices including, for example, keyboard, trackball, and/or pointer devices. In yet further embodiments, the computer system 300 may not include a user interface (e.g., as may be the case in a compressor controller system)

The communications interface 306 may be any interface capable of communicating with other computer systems, peripheral devices, and/or other equipment communicatively coupled to computer system 300. For example, the communications interface 306 may allow the computer system 300 to communicate with other computer systems (e.g., computer systems associated with external databases and/or the Internet), allowing for the transfer as well as reception of data from such systems. The communications interface 306 may include, among other things, a modem, a satellite data transmission system, an Ethernet card, and/or any other suitable device that enables the computer system 300 to connect to databases and networks, such as LANs, MANs, WANs and the Internet.

Processor 302 may include one or more general purpose processors, application specific processors, programmable microprocessors, microcontrollers, digital signal processors, FPGAs, other customizable or programmable processing devices, and/or any other devices or arrangement of devices that are capable of implementing the systems and methods disclosed herein.

Processor 302 may be configured to execute computer-readable instructions stored on non-transitory computer-readable storage medium 310. Computer-readable storage medium 310 may store other data or information as desired. In some embodiments, the computer-readable instructions may include computer executable functional modules 314. For example, the computer-readable instructions may include one or more functional modules configured to implement all or part of the functionality of the systems and methods described above. Specific functional models that may be stored on computer-readable storage medium 310 include surge condition detection modules configured and/or surge condition mitigation modules consistent with the systems and methods disclosed herein.

The system and methods described herein may be implemented independent of the programming language used to create the computer-readable instructions and/or any operating system operating on the computer system 300. For example, the computer-readable instructions may be written in any suitable programming language, examples of which include, but are not limited to, C, C++, Visual C++, and/or Visual Basic, Java, Perl, or any other suitable programming language. Further, the computer-readable instructions and/or functional modules may be in the form of a collection of separate programs or modules, and/or a program module within a larger program or a portion of a program module. The processing of data by computer system 300 may be in response to user commands, results of previous processing, or a request made by another processing machine. It will be appreciated that computer system 300 may utilize any suitable operating system including, for example, Unix, DOS, Android, Symbian, Windows, iOS, OSX, Linux, and/or the like.

Although the foregoing has been described in some detail for purposes of clarity, it will be apparent that certain changes and modifications may be made without departing from the principles thereof. For example, in certain embodiments, the systems and methods disclosed herein may be utilized in compressor systems not included in a vehicle. It is noted that there are many alternative ways of implementing both the processes and systems described herein. Accordingly, the present embodiments are to be considered illustrative and not restrictive, and the invention is not to be limited to the details given herein, but may be modified within the scope and equivalents of the appended claims.

The foregoing specification has been described with reference to various embodiments. However, one of ordinary skill in the art will appreciate that various modifications and changes can be made without departing from the scope of the present disclosure. For example, various operational steps, as well as components for carrying out operational steps, may be implemented in alternate ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

As used herein, the terms "comprises" and "includes," and any other variation thereof, are intended to cover a non-exclusive inclusion, such that a process, a method, an article, or an apparatus that comprises a list of elements does not include only those elements but may include other elements not expressly listed or inherent to such process, method, system, article, or apparatus. Also, as used herein, the terms "coupled," "coupling," and any other variation thereof are intended to cover a physical connection, an electrical connection, a magnetic connection, an optical connection, a communicative connection, a functional connection, and/or any other connection.

Those having skill in the art will appreciate that many changes may be made to the details of the above-described embodiments without departing from the underlying principles of the invention. The scope of the present invention should, therefore, be determined only by the following claims.

The invention claimed is:

1. A method for detecting a surge condition in a compressor system, the method comprising:
   receiving a plurality of flow measurements relating to a flow rate through the compressor system, the plurality of flow measurements comprising an air inlet flow rate and a low pass filtered air inlet flow rate;
   performing an amplitude calculation to identify a possible surge condition based on at least one of the plurality of flow measurements, wherein performing the amplitude calculation comprises:
      comparing the air inlet flow rate with the low pass filtered air inlet flow rate;
      determining that a difference between the air inlet flow rate and the low pass filtered air inlet flow rate is larger than a first threshold or less than a second threshold;
      counting, based on at least one of the flow measurements, a number of flow rate oscillation events;
      determining that the number of flow rate oscillation events exceeds a value; and
      identifying a possible surge event based on the number of flow rate oscillation events exceeding the value;
   performing a frequency calculation to identify the possible surge condition based on at least one of the plurality of flow measurements;
   detecting a surge condition based on results of the amplitude calculation and the frequency calculation;
   generating a surge detection control signal based on the detected surge condition; and
   adjusting an operating parameter of the compressor system based on the surge detection control signal.

2. The method of claim 1, wherein the plurality of flow measurements further comprise a derivative of the air inlet flow rate.

3. The method of claim 1, wherein performing the frequency calculation to identify the possible surge condition comprises:
   comparing a derivative of an air inlet flow rate with a third threshold
   determining that the derivative of the air inlet flow rate is larger than the third threshold;
   maintaining a count of a number of flow rate oscillation events based on at least one of the flow measurements;
   determining that the count exceeds a value; and
   identifying a possible surge event based on count exceeding the value.

4. The method of claim 3, wherein the method further comprises resetting the count if a speed of the compressor system is less than a threshold speed.

5. The method of claim 3, wherein the method further comprises resetting the count if a time span between flow rate oscillation events exceeds a time threshold.

6. The method of claim 1, wherein the surge detection control signal is configured to implement one or more surge condition mitigation methods.

7. A non-transitory computer-readable storage medium storing instructions that, when executed by a processor, cause the processor to perform a method for detecting a surge condition in a compressor system, the method comprising:
   receiving a plurality of flow measurements relating to a flow rate through the compressor system, the plurality of flow measurements comprising an air inlet flow rate and a low pass filtered air inlet flow rate;
   performing an amplitude calculation to identify a possible surge condition based on at least one of the plurality of flow measurements, wherein performing the amplitude calculation comprises:
     comparing the air inlet flow rate with the low pass filtered air inlet flow rate;
     determining that a difference between the air inlet flow rate and the low pass filtered air inlet flow rate is larger than a first threshold or less than a second threshold;
     counting, based on at least one of the flow measurements, a number of flow rate oscillation events;
     determining that the number of flow rate oscillation events exceeds a value; and
     identifying a possible surge event based on the number of flow rate oscillation events exceeding the value;
   performing a frequency calculation to identify the possible surge condition based on at least one of the plurality of flow measurements;
   detecting a surge condition based on results of the amplitude calculation and the frequency calculation;
   generating a surge detection control signal based on the detected surge condition; and
   adjusting an operating parameter of the compressor system based on the surge detection control signal.

8. The non-transitory computer-readable storage medium of claim 7, wherein the plurality of flow measurements further comprise a derivative of the air inlet flow rate.

9. The non-transitory computer-readable storage medium of claim 7, wherein performing the frequency calculation to identify the possible surge condition comprises:
   comparing a derivative of an air inlet flow rate with a third threshold.
   determining that the derivative of the air inlet flow rate is larger than the third threshold;
   maintaining a count of a number of flow rate oscillation events based on at least one of the flow measurements;
   determining that the count exceeds a value; and
   identifying a possible surge event based on the count exceeding the value.

10. The non-transitory computer-readable storage medium of claim 9, wherein the method further comprises resetting the count if a speed of the compressor system is less than a threshold speed.

11. The non-transitory computer-readable storage medium of claim 9, wherein the method further comprises resetting the count if a time span between flow rate oscillation events exceeds a time threshold.

12. The method of claim 7, wherein the surge detection control signal is configured to implement one or more surge condition mitigation methods.

13. A system comprising:
   a compressor system
   a flow meter disposed in an inlet path of the compressor system configured to generate a plurality of flow measurements; and
   a compressor control system communicatively coupled with the flow meter and the compressor system configured to:
     receive the plurality of flow measurements;
     perform an amplitude calculation to identify a possible surge condition based on at least one of the plurality of flow measurements, wherein performing the amplitude calculation comprises:
       comparing an air inlet flow rate with a low pass filtered air inlet flow rate;
       determining that a difference between the air inlet flow rate and the low pass filtered air inlet flow rate is larger than a first threshold or less than a second threshold;
       counting, based on at least one of the flow measurements, a number of flow rate oscillation events;
       determining that the number of flow rate oscillation events exceeds a value; and
       identifying a possible surge event based on the number of flow rate oscillation events exceeding the value;
     perform a frequency calculation to identify the possible surge condition based on at least one of the plurality of flow measurements;
     detect a surge condition based on the results of the amplitude calculation and the frequency calculation; and
     generate a surge detection control signal based on the detected surge condition.

14. The system of claim 13, wherein in performing the frequency calculation the compressor control system is further configured to:
   compare a derivative of an air inlet flow rate with a third threshold,
   determine that the derivative of the air inlet flow rate is larger than the third threshold;
   maintain a count of a number of flow rate oscillation events based on at least one of the flow measurements;
   determine that the count exceeds a value; and
   identify a possible surge event based on the count exceeding the value.

15. The system 14, wherein compressor control system is further configured to reset the count if a speed of the compressor system is less than a threshold speed or if a time span between flow rate oscillation events exceeds a time threshold.

* * * * *